(12) United States Patent
Oka

(10) Patent No.: US 9,313,366 B2
(45) Date of Patent: Apr. 12, 2016

(54) IMAGE PROCESSING APPARATUS AND IMAGE PROCESSING METHOD

(71) Applicant: CANON KABUSHIKI KAISHA, Tokyo (JP)

(72) Inventor: Hiroyuki Oka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/810,837

(22) Filed: Jul. 28, 2015

(65) Prior Publication Data
US 2016/0044208 A1    Feb. 11, 2016

(30) Foreign Application Priority Data

Aug. 5, 2014 (JP) ................................. 2014-159745

(51) Int. Cl.

| G06K 15/00 | (2006.01) |
|---|---|
| G06T 5/00 | (2006.01) |
| H04N 1/407 | (2006.01) |
| H04N 1/409 | (2006.01) |
| H04N 1/00 | (2006.01) |
| G06T 7/00 | (2006.01) |

(52) U.S. Cl.
CPC ............ *H04N 1/4092* (2013.01); *G06T 7/0042* (2013.01); *G06T 7/0085* (2013.01); *H04N 1/00336* (2013.01)

(58) Field of Classification Search
USPC .................................................. 358/1.1–1.18
See application file for complete search history.

(56) References Cited

U.S. PATENT DOCUMENTS

| 8,736,876 B2 * | 5/2014 | Hayakawa | ............ G06F 3/1211 358/1.14 |
|---|---|---|---|
| 8,994,960 B2 * | 3/2015 | Shimahashi | ............. H04N 1/58 347/41 |
| 2010/0128314 A1 | 5/2010 | Loce et al. | |

\* cited by examiner

*Primary Examiner* — Douglas Tran
(74) *Attorney, Agent, or Firm* — Fitzpatrick, Cella, Harper & Scinto

(57) ABSTRACT

An image processing apparatus determines a position separated by a predetermined distance from an edge of an object included in image data. The position is outer side of the object. The apparatus deforms a shape of the object based on the determined position so that the determined position becomes a new edge of the object. And the apparatus performs predetermined image processing for edge, based on the determined position, on the new edge of the object after the deformation is performed.

13 Claims, 17 Drawing Sheets

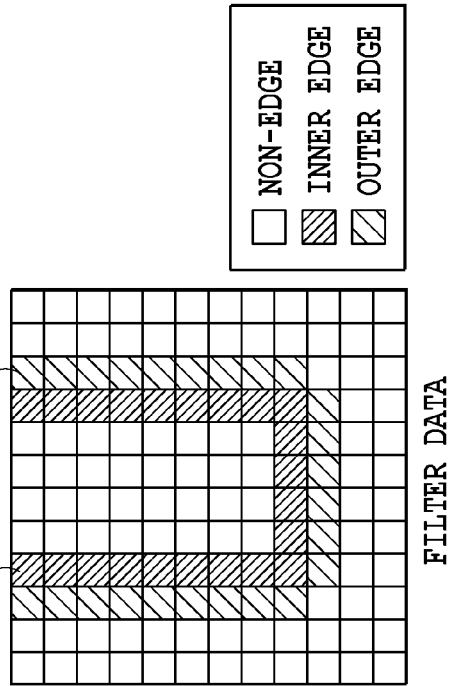

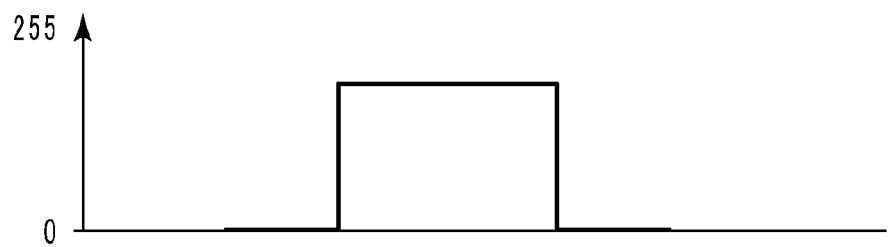
FIG.6A
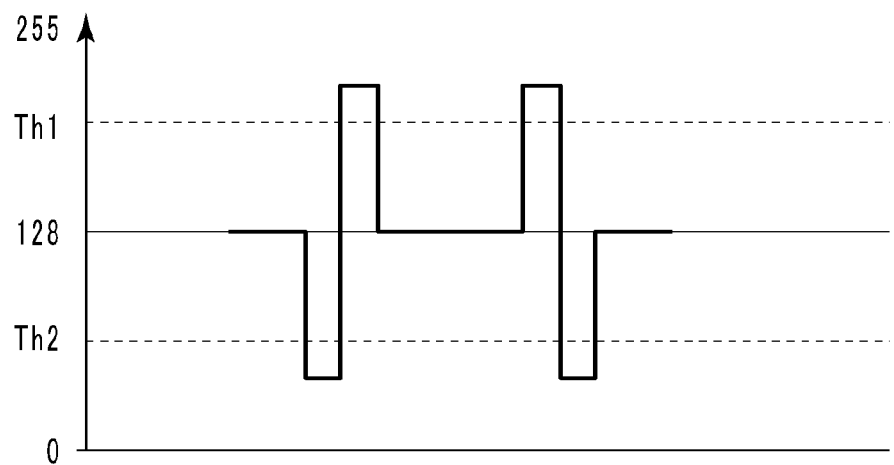
FIG.6B
FIG.6C

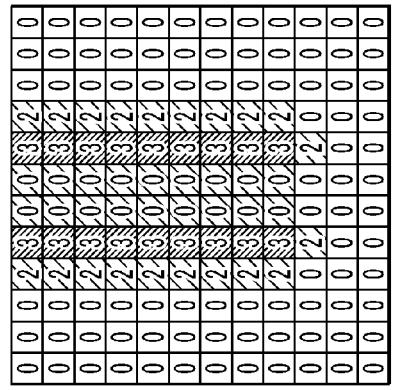
FIG.9A IMAGE DATA
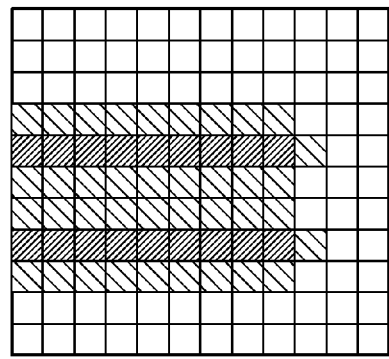
FIG.9B FILTER DATA
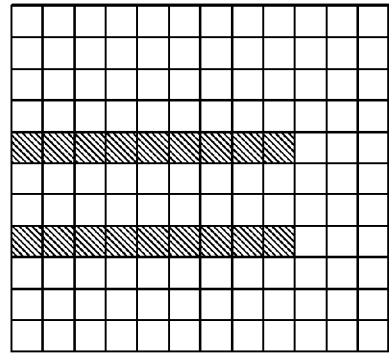
FIG.9C EDGE DATA
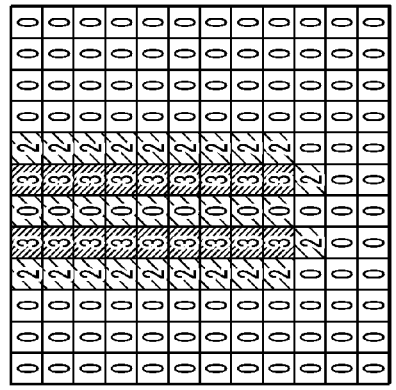
FIG.9D IMAGE DATA
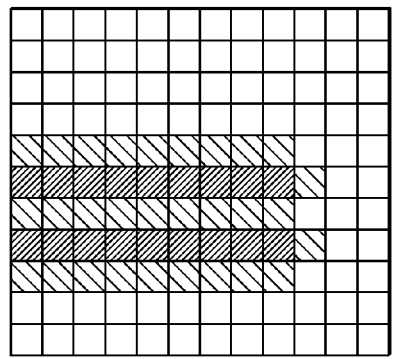
FIG.9E FILTER DATA
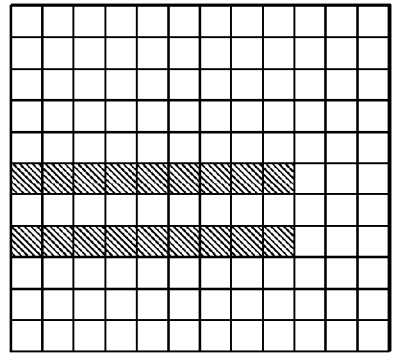
FIG.9F EDGE DATA

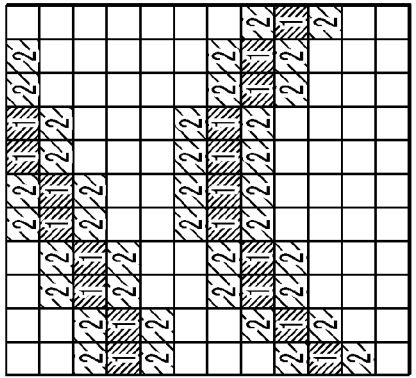
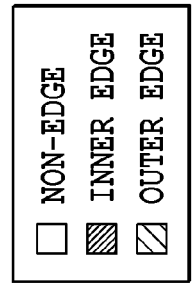
FIG.10A
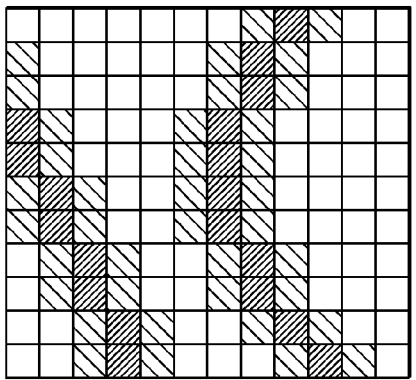
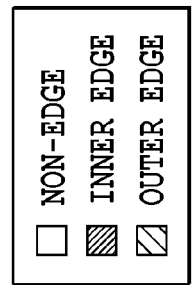
FIG.10B
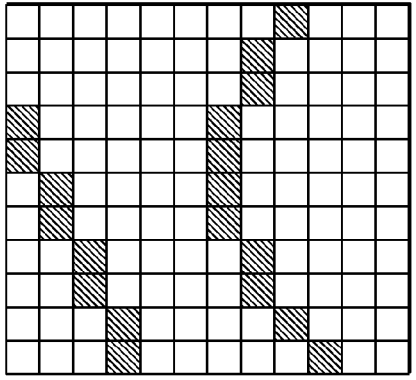
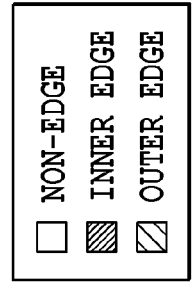
FIG.10C

| SETTING OF "WIDTH TO WHICH OBJECT IS THICKENED" | BIT4 | BIT3 | BIT2 | BIT1 |
|---|---|---|---|---|
| "0 PIXELS" | | | ○ | ○ |
| "1 PIXEL" | | ○ | ○ | |
| "2 PIXELS" | ○ | ○ | | |

FIG.13

| | BASIC PATTERN | 90-DEGREE ROTATION |
|---|---|---|
| PATTERN1 | INNER OUTER / OUTER NON | INNER / OUTER / OUTER / NON |
| PATTERN2 | INNER OUTER / OUTER OUTER | INNER / OUTER / OUTER / OUTER |
| PATTERN3 | INNER NON / OUTER | INNER / OUTER / NON |
| PATTERN4 | INNER INNER / OUTER | INNER / OUTER / INNER |
| PATTERN5 | INNER OUTER / OUTER INNER | INNER / OUTER / OUTER / INNER |

FIG.15A

| | BASIC PATTERN | 90-DEGREE ROTATION |
|---|---|---|
| PATTERN1 | NON OUTER / OUTER INNER | NON / OUTER / OUTER / INNER |
| PATTERN2 | OUTER OUTER / OUTER INNER | OUTER / OUTER / OUTER / INNER |
| PATTERN3 | NON INNER / OUTER | NON / OUTER / INNER |
| PATTERN4 | INNER INNER / OUTER | INNER / OUTER / INNER |
| PATTERN5 | INNER OUTER / OUTER INNER | INNER / OUTER / OUTER / INNER |

FIG.15B

| SETTING OF "WIDTH TO WHICH OBJECT IS THICKENED" | BIT3 | BIT2 | BIT1 |
|---|---|---|---|
| "0 PIXELS" | | | ○ |
| "2 PIXELS" | | ○ | |
| "4 PIXELS" | ○ | | |

FIG.16

IMAGE PROCESSING APPARATUS AND IMAGE PROCESSING METHOD

BACKGROUND OF THE INVENTION

1. Field of the Invention

The present invention relates to an image processing apparatus and image processing method for deforming an edge part.

2. Description of the Related Art

A technology is known which improves an image quality of an object to be printed by executing image processing for an edge part to an edge part of an object included in image data. U.S. Patent Laid-Open No. 2010/0128314 discloses a technology that identifies an edge part of an object included in image data by analyzing the image data and executes enlarging (deforming) process on the identified edge part of the object. U.S. Patent Laid-Open No. 2010/0128314 mentioned above further discloses a technology that re-identifies the edge part of the object thus enlarged by analyzing the image data including the enlarged object again and executes screen processing for an edge part to the re-identified edge part.

However, with the technology disclosed in U.S. Patent Laid-Open No. 2010/0128314, the image data is analyzed in order to identify the edge part of the object to be deformed, and the image data is analyzed again in order to identify the edge part of the object after the deformation. As described above, re-analysis of the image data invites an increase in a calculation cost.

SUMMARY OF THE INVENTION

An image processing apparatus comprising: a determining unit configured to determine a position separated by a predetermined distance from an edge of an object included in image data, the position being outer side of the object; a deforming unit configured to deform a shape of the object based on the determined position so that the determined position become a new edge of the object; and a processing unit configured to perform predetermined image processing for edge, based on the determined position, on the new edge of the object after the deformation is performed by the deforming unit.

Further features of the present invention will become apparent from the following description of exemplary embodiments (with reference to the attached drawings).

BRIEF DESCRIPTION OF THE DRAWINGS

FIGS. 4A and 4B are diagrams illustrating an example of data after filtering processing and edge data used in the explanation of the first embodiment;

FIG. 4C is a diagram illustrating an example of data after the filtering processing and edge data used in the explanation of a third embodiment;

FIG. 4D is a diagram illustrating an example of data after the filtering processing and edge data used in the explanation of a fourth embodiment;

FIGS. 6A to 6C are diagrams for explaining the filtering processing used in the explanation of the first embodiment;

FIGS. 9A to 9F are diagrams illustrating cases in which the thickening processing used in the explanation of the first embodiment should be cancelled;

FIGS. 10A to 10C are diagrams for explaining pattern matching used in the explanation of the first embodiment;

FIG. 13 is a diagram illustrating a method of referring to an edge position after thickening processing used in the explanation of the third embodiment;

FIGS. 15A and 15B are diagrams illustrating a pattern for determining an edge after the thickening processing used in the explanation of the third embodiment;

FIG. 16 is a diagram illustrating a method of referring to the edge position after thickening processing used in the explanation of the fourth embodiment.

DESCRIPTION OF THE EMBODIMENTS

Embodiments to implement the present invention will be described below by using the attached drawings.

Configurations illustrated in the embodiments below are only examples, and the present invention is not limited thereto.

<First Embodiment>

In a first embodiment, processing of thickening an edge part through enlargement only by 1 pixel in four directions, that is, upper, lower, right, and left directions will be described as an example of deforming an object in image data. Moreover, an image processing apparatus for switching, after thickening, a method of image processing between the edge part of the object after being thickened and an inside of the object after being thickened will be described.

Figure 1:
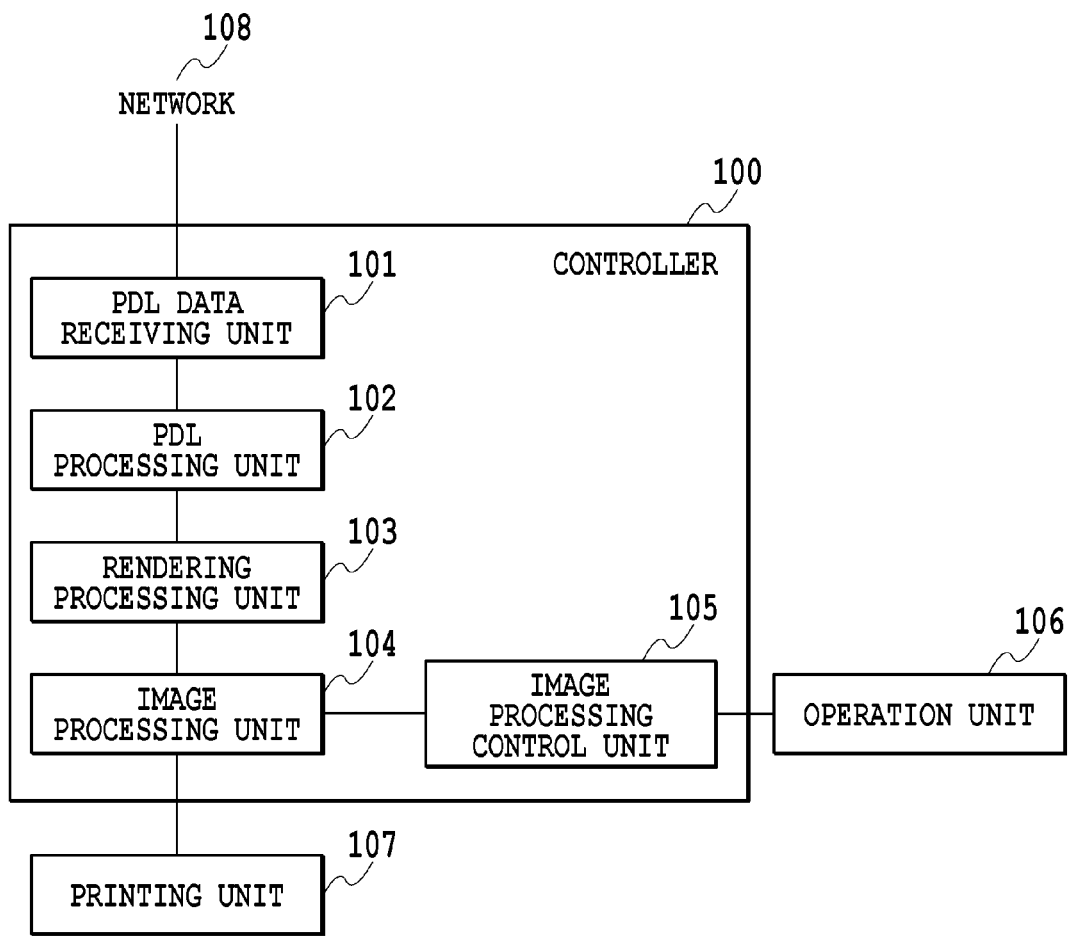
FIG. 1 is a diagram illustrating a configuration of an image processing apparatus used in explanation of a first embodiment.

FIG. 1 illustrates a configuration of a printer including the image processing apparatus in this embodiment. The printer in this embodiment has a controller 100, an operation unit 106, and a printing unit 107. The printer is connected to a network 108.

The controller 100 receives PDL data from the network 108. PDL is abbreviation of Page Description Language and is a command system generally used for expressing rendering on a page. Moreover, the controller 100 obtains setting information on a "width to which an object is thickened" set by a user through the operation unit 106. Then, the controller 100, after converting the PDL data to a bitmap-format image data, executes image processing based on the setting information on the "width to which an object is thickened". The details will be described later. Then, the controller 100 outputs the bitmap-format image data subjected to the image processing to the printing unit 107.

The operation unit 106 may be a liquid crystal touch panel, for example, in this embodiment. The operation unit 106 receives each operation from the user. The operation unit 106 transmits the setting information on the "width to which an object is thickened" to the controller 100 in accordance with each operation from the user, for example.

The printing unit 107 prints an image on a paper medium by using a color material such as ink, toner or the like on the basis of the bitmap-format image data obtained from the controller 100.

[Description of Controller 100]

A configuration of the controller 100 will be described. The controller 100 has a CPU, a ROM, and a RAM, not shown. This CPU develops a program recorded in the ROM into the RAM and executes it, whereby a PDL data receiving unit 101, a PDL processing unit 102, and an image processing control unit 105 are realized. In this embodiment, a rendering processing unit 103 and an image processing unit 104 are assumed to be implemented as a semiconductor integrated circuit. It is needless to say that the rendering processing unit 103 and the image processing unit 104 may be implemented as a program executed by the CPU.

The PDL data receiving unit 101 receives the PDL data from the network 108 and outputs it to the PDL processing unit 102.

The PDL processing unit 102 interprets a rendering instruction expressed by the PDL data received in the PDL data receiving unit 101 and outputs the rendering instruction to the rendering processing unit 103.

The rendering processing unit 103 generates bitmap-format image data on the basis of the rendering instruction outputted from the PDL processing unit 102 and outputs the generated image data to the image processing unit 104. This image data has density information for four colors, that is, cyan, magenta, yellow, and black, for example, which are color materials (that is, process colors) handled by the printing unit 107. It is also assumed to have density information in 8-bit gradation from 0 to 255 for each pixel of the image data.

The image processing control unit 105 obtains the setting information on the "width to which an object is thickened" from the operation unit 106. The image processing control unit 105 instructs, on the basis of this setting information, a method that each unit of the image processing unit 104 which will be described later determines a "position of an edge part before an object is thickened" and a "position of an edge part after an object is thickened" to the image processing unit 104. Specifically, the image processing control unit 105 instructs the image processing unit 104 which values in edge data indicate the "position of an edge part before an object is thickened" and the "position of an edge part after an object is thickened". The details will be described later.

The image processing unit 104 executes each processing on the basis of the image data obtained from the rendering processing unit 103 and the instruction set by the image processing control unit 105. The details of this processing will be described later in [Description of Image Processing Unit 104]. Then, the image processing unit 104 outputs the bitmap-format image data subjected to each processing to the printing unit 107.

[Description of Image Processing Unit 104]

Figure 2:
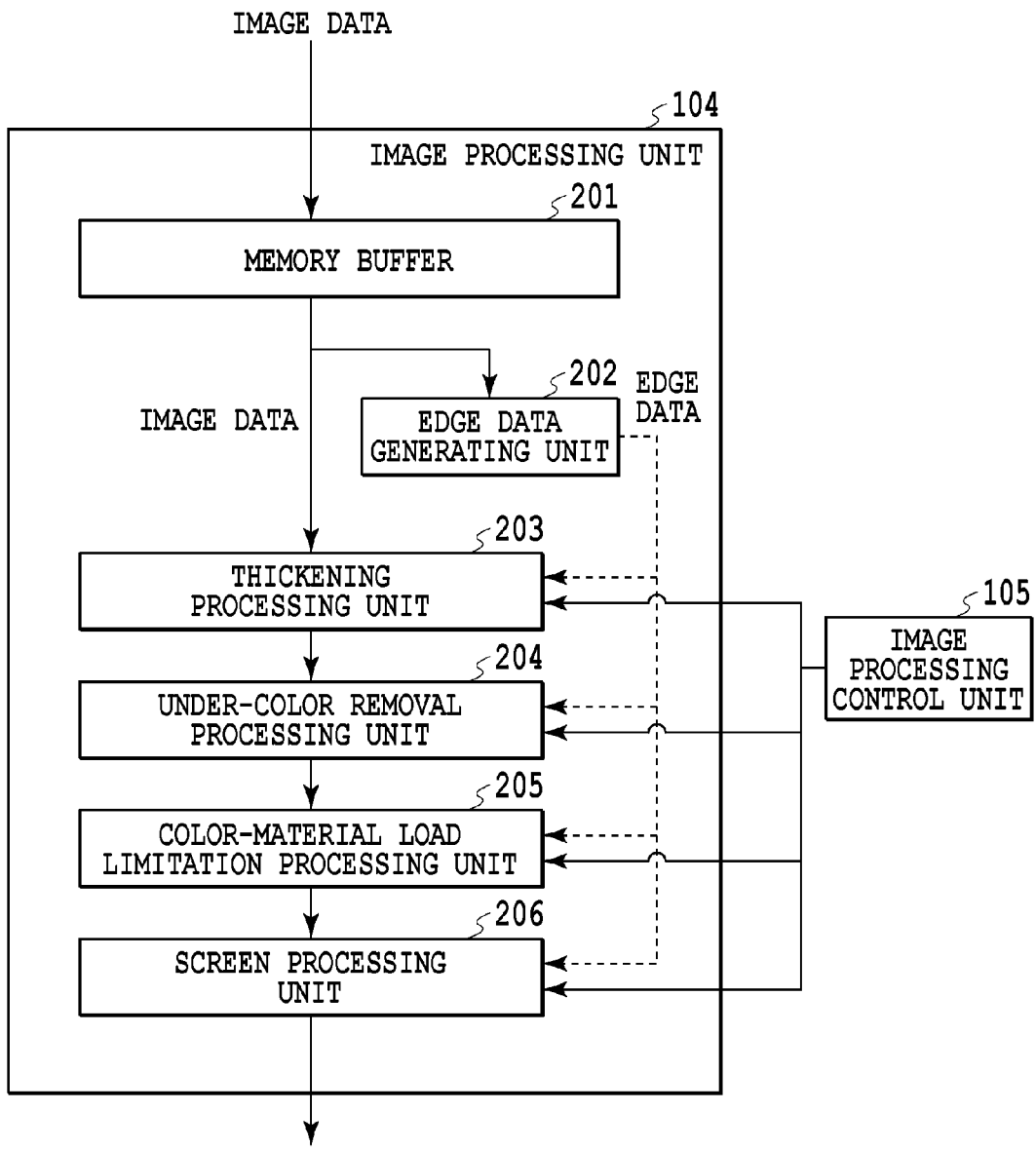
FIG. 2 is a diagram illustrating the configuration of an image processing unit used in the explanation of the first embodiment.

Subsequently, the details of each processing of the image processing unit 104 will be described. FIG. 2 is a diagram illustrating a configuration of the image processing unit 104. The image processing unit 104 has a memory buffer 201, an edge data generating unit 202, a thickening processing unit 203, an under-color removal processing unit 204, a color-material load limitation processing unit 205, and a screen processing unit 206. The memory buffer 201 sequentially accumulates the bitmap-format image data obtained from the rendering processing unit 103. Then, in a case that the image data with a predetermined band width is accumulated, the image data with that band width is outputted to the edge data generating unit 202 and the thickening processing unit 203.

The edge data generating unit 202 determines the "position of an edge part before an object is thickened" and the "position of an edge part after an object is thickened" of the image data obtained from the memory buffer 201 and generates edge data including the information. The details of processing in the edge data generating unit 202 for generating this edge data will be described later in [Description of Edge Data Generating Unit 202]. The edge data generating unit 202 outputs the generated edge data to the thickening processing unit 203, the under-color removal processing unit 204, the color-material load limitation processing unit 205, and the screen processing unit 206.

This edge data has a bitmap format of the same size as that of the image data and has 2-bit information for each pixel. The lowest bit indicates information on the "position of an edge part before an object is thickened". In a case that a value of the lowest bit is 0, the pixel is not an edge part before being thickened, while in a case that the value is 1, it indicates that the pixel is an edge part before being thickened. A second bit from the lowest indicates information on the "position of an edge part after an object is thickened". In a case that a value of the second bit from the lowest is 0, the pixel is not an edge part after being thickened, while in a case that the value is 1, it indicates that the pixel is an edge part after being thickened. It is needless to say that such bit assignment is only an example and the assignment may be in any form as long as the information indicating the "position of an edge part before an object is thickened" and the "position of an edge part after an object is thickened" is included.

Figure 3A:
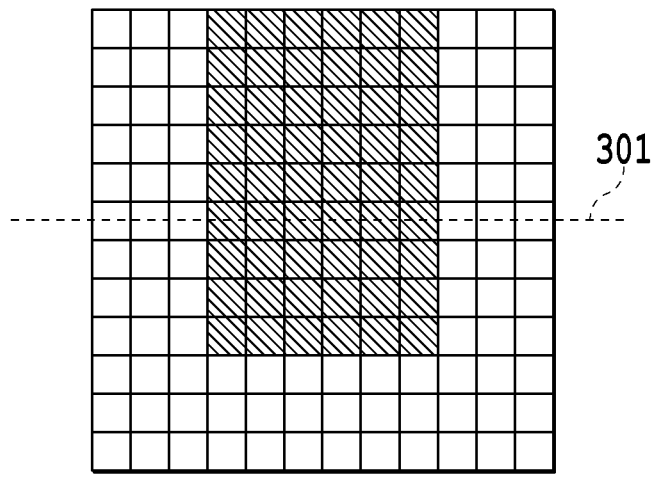
FIGS. 3A and 3B are diagrams illustrating an example of image data before and after thickening processing used in the explanation of the first embodiment.
Figure 3B:
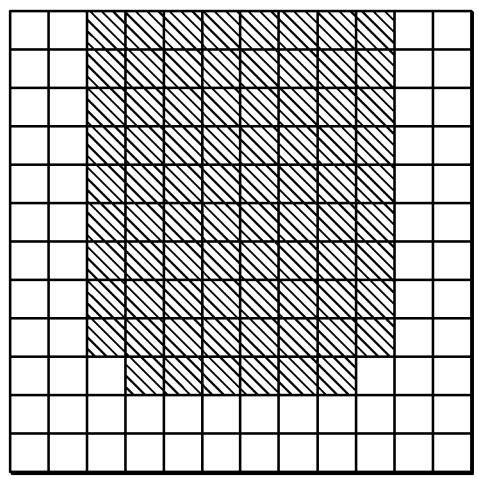

Subsequently, the edge data will be described by using FIGS. 3A and 3B, and FIG. 4B. FIGS. 3A and 3B are diagrams illustrating a part of an object extracted from the image data. FIG. 3A is the image data before the thickening processing, and FIG. 3B is the image data after the thickening processing. FIGS. 4A and 4B are diagrams illustrating the edge data and data after filtering processing which is a source for generating the edge data. The details of the image data after the thickening processing in FIG. 3B and filter data in FIG. 4A will be described later. Here, the edge data will be described.

The edge data generated from the image data illustrated in FIG. 3A is shown in FIG. 4B. In FIG. 3A, hatched pixels indicate pixels by which an object is rendered. The edge data in FIG. 4B actually has 2-bit information for each pixel, but it is expressed in decimal numerical values on the drawings for convenience of explanation. That is, in the edge data in FIG. 4B, the pixel with the numerical value of "1" is a pixel at the "position of an edge part before an object is thickened", and the pixel with the numerical value "2" is a pixel at the "position of an edge part after an object is thickened". The details of processing for generating the edge data as in FIG. 4B will be described later.

The thickening processing unit 203 determines the "position of an edge part before an object is thickened" and the "position of an edge part after an object is thickened" on the basis of the edge data obtained from the edge data generating unit 202 and the instruction of the image processing control unit 105. In the instruction of the image processing control unit 105 according to the first embodiment, the lowest bit of each pixel included in the edge data instructs to express information on the "position of an edge part before an object is thickened". The second bit from the lowest instructs to express information on the "position of an edge part after an object is thickened". The thickening processing unit 203 executes the processing for thickening an object in the image data obtained from the memory buffer 201 and outputs the image data including the object after being thickened to the under-color removal processing unit 204. The details of the processing in the thickening processing unit 203 will be described later in [Description of Thickening Processing Unit 203].

The under-color removal processing unit 204 determines the "position of an edge part after an object is thickened" on the basis of the edge data obtained from the edge data generating unit 202 and the instruction of the image processing control unit 105. Then, it executes the under-color removal processing for the edge part of the image data obtained from the thickening processing unit 203. The under color is a minimum value of density in cyan, magenta, and yellow of each pixel in the image data. This under color can be replaced by a color material in black with the same density. By replacing the under color by the black color material, a color material amount of the edge part is reduced, whereby deterioration of an image quality such as bleeding, scattering, and color deviation is suppressed.

The color-material load limitation processing unit 205 determines the "position of an edge part after an object is thickened" on the basis of the edge data obtained from the edge data generating unit 202 and the instruction of the image processing control unit 105. Then, color-material load limitation processing different between the edge part of the image data obtained from the under-color removal processing unit 204 and the others is executed. The color-material load limitation is limitation on a total of densities of the color materials (this is called a color-material load) per unit area. That is because, in a case that a large quantity of color material per unit area is loaded on a paper medium, defects of an image quality such as defective transfer or fixation occur. This color-material load limitation preferably limits a color-material load at a lower value for an edge part of an object. That is because not only the defective transfer or fixation but also image defects such as bleeding and scattering can easily occur in the edge part. Thus, the color-material load limitation processing unit 205 switches a limitation value of the color material load between the edge part and the others. Processing of reducing a density of each color material by a constant rate is executed until the color-material load limitation value is reached for a pixel exceeding the limitation value of the color-material load.

The screen processing unit 206 determines the "position of an edge part after an object is thickened" on the basis of the edge data obtained from the edge data generating unit 202 and the instruction of the image processing control unit 105. Then, screen processing is executed to the image data obtained from the color-material load limitation processing unit 205. At this time, screen processing with a high line number is executed for the edge part, while the screen processing with a low line number is executed for the others. That is because, the screen with the low line number is not suitable for the edge part since a granular feeling can occur easily but is suitable for an inside of an object since its tone is smooth, while the screen with the high line number is suitable for the edge part of an object since the tone is not smooth but the granular feeling does not occur easily.

[Description of Edge Data Generating Unit 202]

Figure 5:
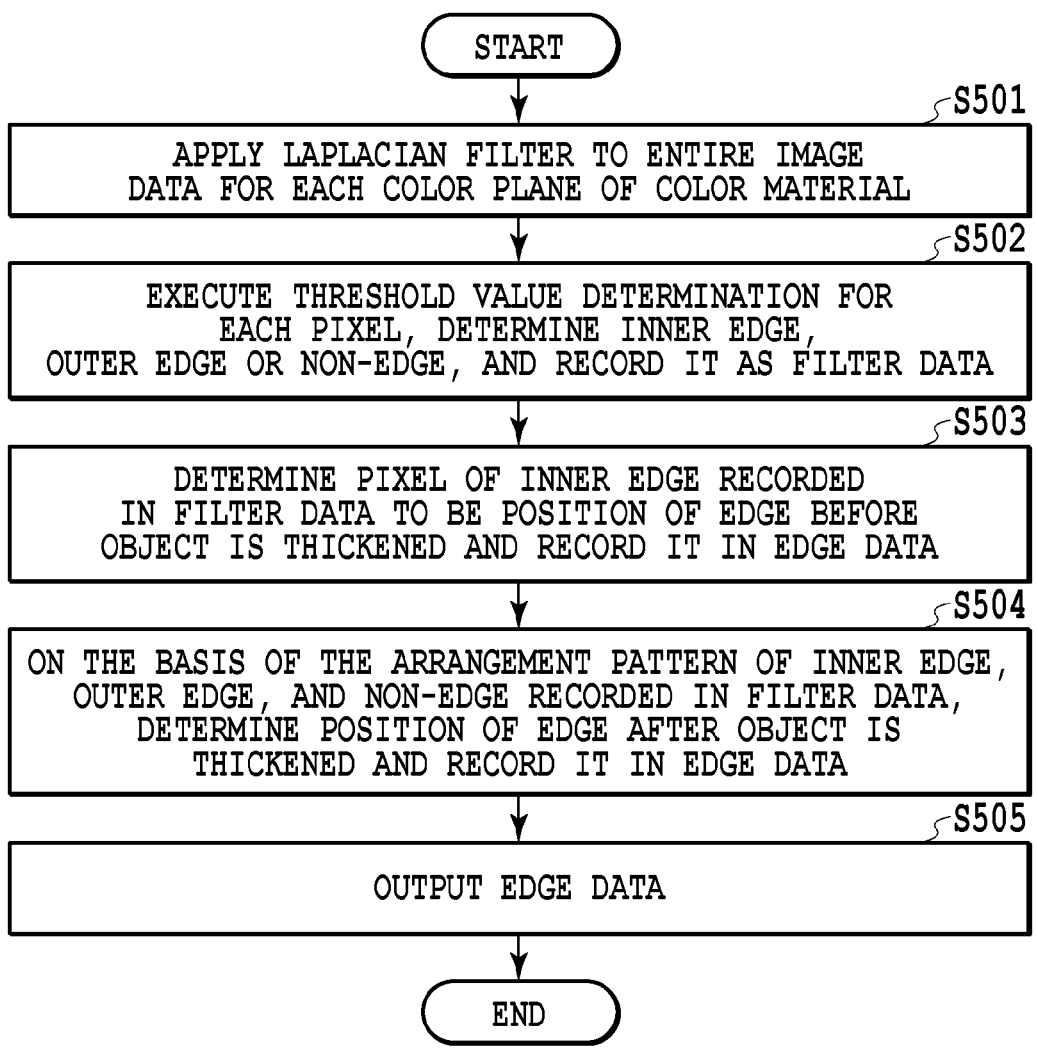
FIG. 5 is a flowchart illustrating processing of an edge data generating unit used in the explanation of the first embodiment.

The processing of the edge data generating unit 202 is illustrated in a flowchart in FIG. 5. At Step S501, the edge data generating unit 202 applies a Laplacian filter to the entire image data for each color plane of a color material in the image data. This Laplacian filter is a filter of a 3×3 matrix as illustrated in FIG. 6A. The edge data generating unit 202 performs convolution calculation of the Laplacian filter in FIG. 6A by referring to values of a pixel of interest and adjacent pixels thereof. Then, the edge data generating unit 202 further divides a calculation result of the convolution calculation by 16 and adds offset of 128, and thus a normalized value with a minimum value of 0, a central value of 128, and a maximum value of 255 is calculated. An effect of the Laplacian filter will be described. A sectional diagram of density distribution of a color material having a dotted line 301 with respect to the image data in FIG. 3A is illustrated in FIG. 6B. By applying the Laplacian filter to that for normalization, distribution in FIG. 6C is obtained. In FIG. 6C, an inside of an edge of the object is larger than the central value 128 and an outside of the edge is smaller than the central value 128. Information not only on the edge position of the object but also on inside and outside of the object can be discriminated by whether a value is larger or smaller than the central value 128. This is the effect of the Laplacian filter. Here, the edge part inside the object is referred to as an inner edge and the edge part outside the object as an outer edge.

At Step S502, the edge data generating unit 202 determines whether each pixel is an inner edge, an outer edge or a non-edge on the basis of the value obtained by applying the Laplacian filter obtained at Step S501 to each pixel. Specifically, the edge data generating unit 202 executes threshold-value determination on the basis of the value obtained at Step S501 for each pixel. A purpose of this processing is to extract only an edge with a certain strength or more and to exclude edges of two objects adjacent to each other. In a region where the two objects are adjacent to each other, a color plane with a positive result of the Laplacian filter and a color plane with a negative result are mixed. In a case that the both objects are thickened at such a spot, the color planes are overlapped with each other, and another pseudo object is generated. Such a region can be excluded by the processing at this Step S502.

Figure 7:
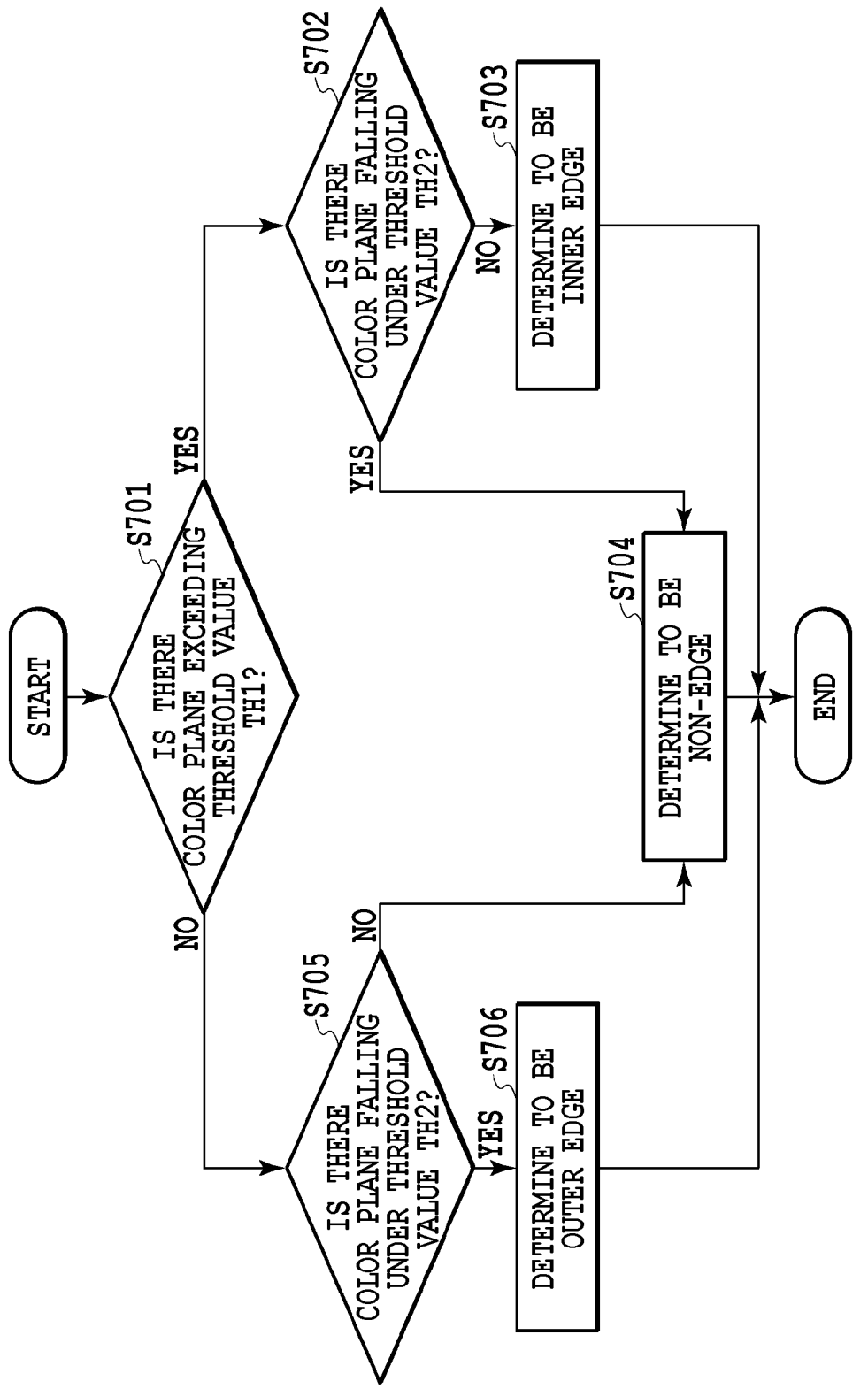
FIG. 7 is a flowchart illustrating processing of threshold value determination used in the explanation of the first embodiment.

FIG. 7 is a diagram illustrating a flowchart of the processing of threshold value determination at Step S502. At Step S701, the edge data generating unit 202 determines whether or not there is a color plane exceeding a threshold value TH1 for the pixel of interest. In a case that there is a color plane exceeding the threshold value TH1, it is further determined at Step S702 whether or not there is a color plane falling under a threshold value TH2. In a case that there is no color plane falling under the threshold value TH2, the edge data generating unit 202 determines at Step S703 that the pixel of interest is an inner edge which is an edge inside the object. On the other hand, in a case that there is a color plane falling under the threshold value TH2 at Step S702, it means that a color plane inside the object and a color plane outside the object are mixed. Such a pixel does not need image processing for an edge. Thus, at Step S704, the edge data generating unit 202 determines that the pixel of interest is a non-edge. Moreover, in a case that there is no color plane exceeding the threshold value TH1 at Step S701, it is further determined at Step S705 whether or not there is a color plane falling under the threshold value TH2. In a case that there is a color plane falling under the threshold value TH2, the edge data generating unit 202 determines at Step S706 that the pixel of interest is an outer edge which is an edge outside an object. On the other hand, in a case that there is no color plane falling under the threshold value TH2 at Step S705, the edge data generating unit 202 determines that the pixel of interest is a non-edge.

Data recording the "inner edge", the "outer edge", and the "non-edge" determined as above in the bitmap format with the same pixel number as that of the image data is generated. This data is assumed to be called "filter data". An actual recording method may record the inner edge to be 1, the outer edge to be 2, and the non-edge to be 0 for each pixel of the filter data. FIG. 4A illustrates the filter data generated from the image data in FIG. 3A. Here, for facilitation of explanation, a cell indicated by a shaded part 401 indicates a pixel of the inner edge, while a cell by a shaded part 402 indicates a pixel of the outer edge.

Subsequently, returning to the flowchart in FIG. 5, explanation will be continued. At Step S503, the edge data generating unit 202 determines that the pixel recorded as the "inner edge" in the filter data is at a "position of an edge before an object is thickened". Then, the edge data generating unit 202 sets 1 to the lowest bit of a value of the pixel in the edge data, whereby the "position of an edge part before an object is thickened" is recorded in the edge data.

Figure 8:
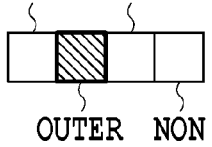
FIG. 8 is a diagram illustrating a pattern for determining an edge after the thickening processing used in the explanation of the first embodiment.

At Step S504, the edge data generating unit 202 determines the "position of an edge part after an object is thickened" by an arrangement pattern of the "inner edge", the "outer edge", and the "non-edge" recorded in the filter data. As the determining method, pattern matching of all the patterns illustrated in FIG. 8 is executed for the filter data. A cell surrounded by a bold frame in FIG. 8 is a pixel of interest, and cells described as "inner", "outer", and "non" indicate pixels matching the inner edge, the outer edge, and the non-edge, respectively, in order. Moreover, a shaded cell indicates a pixel indicating the "position of an edge part after an object is thickened" in a case that the pattern is matched. For each of the patterns, patterns obtained by rotating a basic pattern by 90 degrees, 180 degrees, and 270 degrees are also used as patterns. That is because the directions for thickening in the first embodiment are upper, lower, right, and left and have no dependence on directions. By applying this pattern matching to the filter data in FIG. 4A, the edge data illustrated in FIG. 4B is generated as mentioned above. As mentioned above, the value of "1" indicating the "position of an edge part before an object is thickened" is given to the pixel of the inner edge. Moreover, as the result of the pattern matching illustrated in FIG. 8, the value of "2" indicating the "position of an edge part after an object is thickened" is given to each pixel matching the pattern 3 (that is, a pixel of an outer edge). Moreover, the value of "0" indicating the non-edge is given to the other pixels.

Subsequently, a reason why the patterns in FIG. 8 are used will be described. The "position of an edge part after an object is thickened" is basically an outer edge adjacent to an inner edge in an upper, lower, right or left direction. Thus, the pattern 3 is a pattern for detecting such arrangement. However, not all the outer edges are at the "positions of an edge part after an object is thickened". That is a case as illustrated in FIGS. 9A and 9D in which the objects are close to each other such that the two objects are rendered in a distance within two pixels. FIGS. 9A and 9D illustrate the image data, and a hatched pixel indicates a pixel of the object. The filter data generated for FIGS. 9A and 9D are illustrated in FIGS. 9C and 9F, respectively. Assuming that this outer edge is at the "position of an edge part after an object is thickened", the two objects are connected after the object is thickened. Thus, in a case in which there are two inner edges sandwiching the outer edge within three pixels, not the outer edge but the inner edge is set to the "position of an edge part after an object is thickened" so that the object is not thickened. A pattern 4 and a pattern 5 in FIG. 8 are patterns for detecting such arrangement. The edge data generated from FIGS. 9A and 9D are illustrated in FIGS. 9C and 9F, respectively. As mentioned above, in the pixel of the inner edge, the lowest bit indicating the "position of an edge part before an object is thickened" is "1". Moreover, the second bit from the lowest indicating the "position of an edge part after an object is thickened" in the pixel of the inner edge is "1". Therefore, in the edge data in FIGS. 9C and 9F, the value of 3 in the decimal notation is given to the pixel of the inner edge. Regarding the outer edge other than the adjacent directions, the second bit from the lowest indicating the "position of an edge part after an object is thickened" is given "1" (that is, 2 in the decimal notation) since it matches the pattern 3 in FIG. 8.

Moreover, in the pattern 3 in FIG. 8, an edge adjacent to the outer edge adjacent to the inner edge is a non-edge, but it may be an outer edge except a case in which the further adjacent one is an inner edge (pattern 4 and pattern 5). FIG. 10A illustrates image data expressing a figure of a diagonal line and a curved line, for example. The filter data corresponding to the image data in FIG. 10A becomes the one as illustrated in FIG. 10B. As mentioned above, the directions for thickening in the first embodiment are upper, lower, right and left and there is no dependence on directions, and thus, it is possible to thicken the diagonal line or curved line even only with the pattern 3. However, as will be described in a third embodiment which will be described later, in a form in which a direction for thickening is limited only to a certain direction, the filter data as in FIG. 10B cannot be thickened in the right and left directions only with the pattern 3. Thus, by preparing a pattern 1 and a pattern 2 in FIG. 8, the diagonal line in FIG. 10B can be thickened in the lateral direction. The pattern 1 and the pattern 2 are the patterns for detecting such arrangement. FIG. 10C is a diagram illustrating the edge data based on FIG. 10B.

Due to the reason as mentioned above, the patterns 1 to 3 in FIG. 8 are those for detecting a pattern in which the outer edge is at the "position of an edge part after an object is thickened". Moreover, the patterns 4 and 5 are those for detecting a pattern in which the inner edge is at the "position of an edge part after an object is thickened".

As mentioned above, by means of the processing of the edge data generating unit 202, an edge position after thickening can be identified before the thickening processing.

[Description of Thickening Processing Unit 203]

The processing of the thickening processing unit 203 will be described. The thickening processing unit 203 realizes processing of thickening an object by overwriting a pixel value at the "position of an edge part before thickening" on the pixel at the "position of an edge part after an object is thickened".

Figure 11:
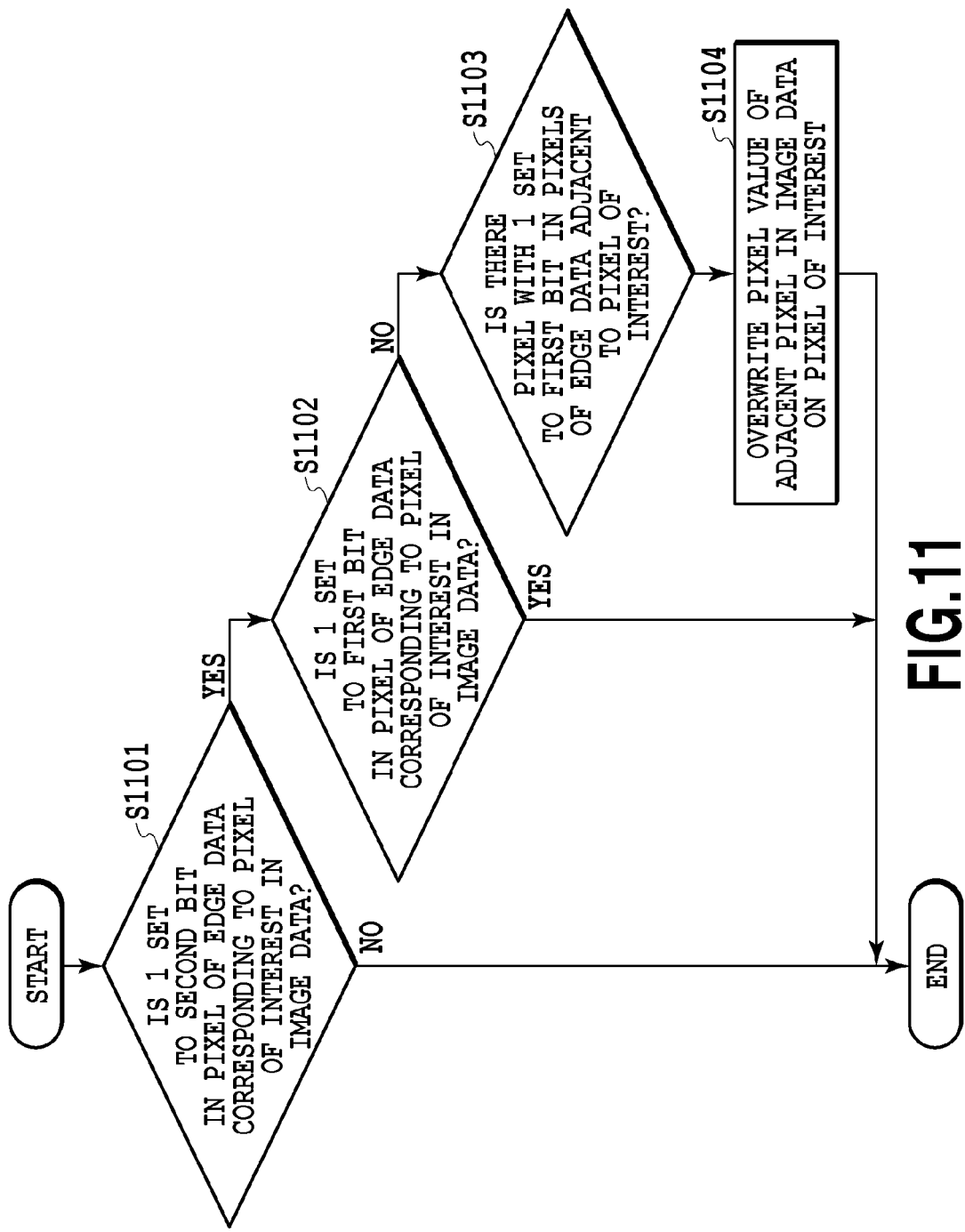
FIG. 11 is a diagram illustrating a flowchart of the thickening processing used in the explanation of the first embodiment.

FIG. 11 is a diagram illustrating a flowchart of the processing of the thickening processing unit 203. At Step S1101, the thickening processing unit 203 determines whether or not 1 is set to the second bit of the pixel of the corresponding edge data for the pixel of interest in the image data. In a case that 1 is not set to the second bit, it is not the "position of an edge part after an object is thickened" and thus, the processing is finished, and the process proceeds to the processing of the next pixel. In a case that 1 is set to the second bit, at Step S1102, it is further determined whether or not 1 is set to the first bit. In a case that 1 is set to the first bit, it indicates that the position of the edge is not changed before and after the thickening processing and thus, the processing is finished, and the process proceeds to the processing of the next pixel. In a case that 1 is not set to the first bit, at Step S1103, a pixel in which 1 is set to the first bit is detected in the pixels adjacent in the upper, lower, right and left directions. In a case that an adjacent pixel in which 1 is set to the first bit is found, at Step S1104, a value of the pixel in the image data is overwritten to the value of the pixel of interest.

By executing the processing mentioned above for the entire image data and edge data, the object in the image data can be thickened by 1 pixel in the upper, lower, right, and left directions. As an example, the image data after the object is thickened on the basis of the image data in FIG. 3A and the edge data in FIG. 4B is illustrated in FIG. 3B.

As mentioned above, according to the first embodiment, the "position of an edge part after an object is thickened" is determined before the object of the image data is thickened. As a result, after the object is thickened, the method of image processing can be switched between the edge part of the object and the inside of the object without determining the position of the edge part again.

In the above-described first embodiment, thickening the width is described as an example of deformation processing of an object in the image data, but it may be processing of thinning the width of the object as the deformation processing. Specifically, a pattern used in the pattern matching in FIG. 8 may be used for a pattern corresponding to the processing of thinning the width of the object. For example, in the case of the basic pattern of the pattern 3 in FIG. 8, a pattern including a pixel of a non-edge on the left side of the inner edge may be prepared, and the position of the edge after the deformation may be made a pixel of the non-edge on the left side of the inner edge. In that case, processing of thinning by overwriting the pixel value of the pixel of the inner edge with the pixel value of the pixel of the non-edge (pixel outside the object) adjacent on the right side may be executed. In the processing of thinning the width of the object, too, the image processing control unit 105 can execute the processing as mentioned above on the basis of the setting information on the "deformation width of an edge part after deformation of an object" obtained from the operation unit 106.

<Second Embodiment>

In the first embodiment, the example is described in which various types of image processing are executed on the basis of the information on the "position of an edge part after thickening" generated in advance after the object of the image data is thickened.

In the second embodiment, in the various types of image processing before an object is thickened, various types of processing are executed on the basis of the information on the "position of an edge part before thickening". Then, an image processing apparatus in which, in the various types of image processing after thickening, various types of image processing are executed on the basis of the information on the "position of an edge part after thickening" will be described.

Figure 12:
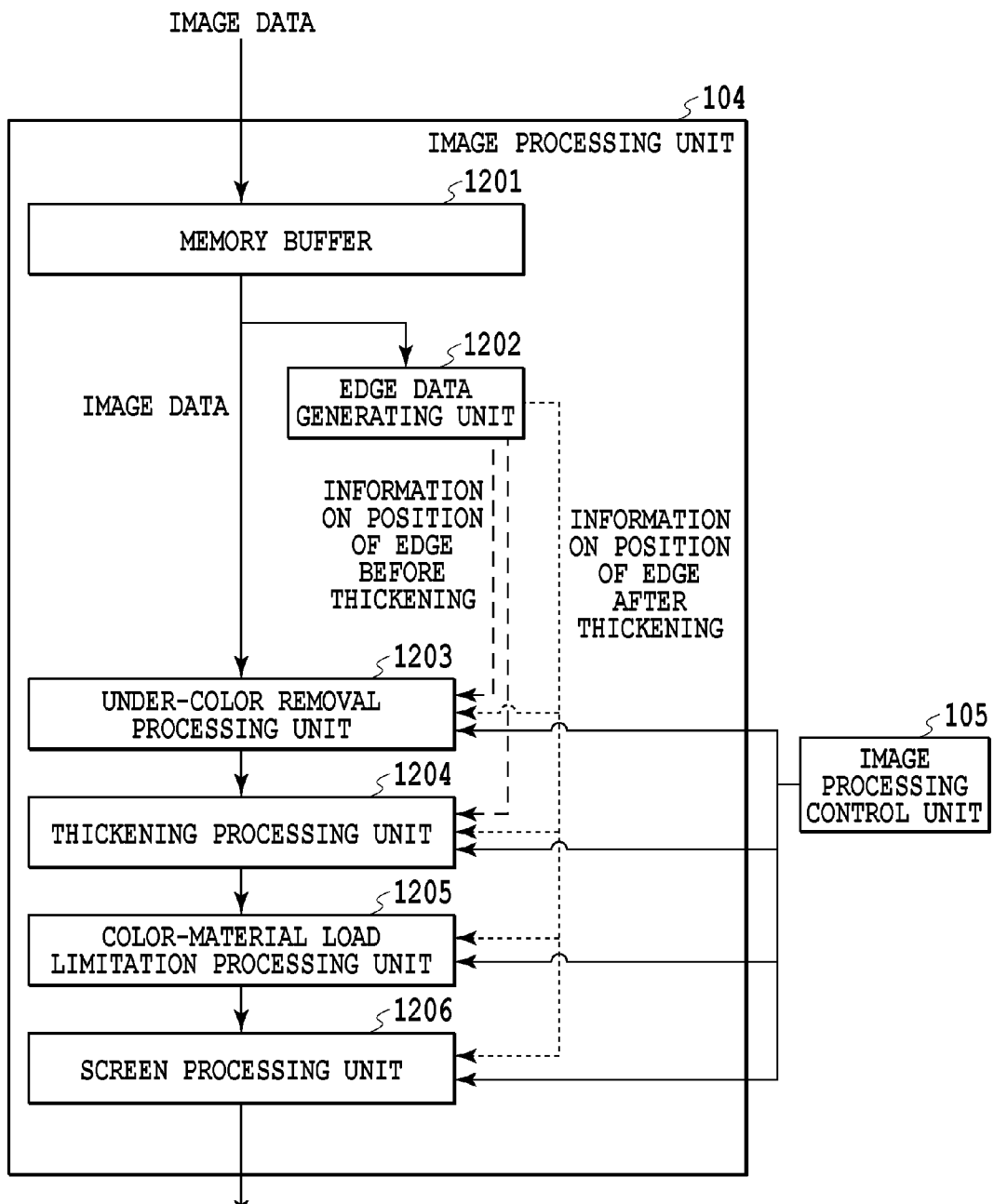
FIG. 12 is a diagram illustrating a configuration of an image processing unit used in the explanation of a second embodiment.

FIG. 12 illustrates a configuration of the image processing unit 104 in the second embodiment. There are three different points from the first embodiment. The first difference is that an under-color removal processing unit 1203 is located in a preceding stage of a thickening processing unit 1204. The second difference is that the information on the "position of an edge part before an object is thickened" generated by an edge data generating unit 1202 is outputted to the under-color removal processing unit 1203 and the thickening processing unit 1204. The third difference is that the information on the "position of an edge part after an object is thickened" generated by the edge data generating unit 1202 is outputted to the thickening processing unit 1204, a color-material load limitation processing unit 1205, and a screen processing unit 1206.

The edge data generating unit 1202 determines the "position of an edge part before an object is thickened" and the "position of an edge part after an object is thickened" for the image data obtained from a memory buffer 1201. However, two pieces of the edge data in total including the information separately are generated. That is, in the second embodiment, the edge data generating unit 1202 generates the edge data holding the information on the "position of an edge part before an object is thickened" in the 1-bit bitmap format. Moreover, the edge data generating unit 1202 generates the edge data holding the information on the "position of an edge part after an object is thickened" in the 1-bit bitmap format.

The under-color removal processing unit 1203 obtains the edge data having the information on the "position of an edge part before an object is thickened" from the edge data generating unit 1202 and executes the under-color removal processing to the edge part of the image data obtained from the memory buffer 1201. The pixel value of the edge part to which the under-color removal processing was executed is used as a pixel value of the pixel after thickening in the thickening processing unit 1204 after that. Therefore, the effect similar to the under-color removal at the edge position executed after thickening is obtained.

The thickening processing unit 1204 obtains the edge data having the information on the "position of an edge part before an object is thickened" and the edge data having the information on the "position of an edge part after an object is thickened" from the edge data generating unit. Then, it executes processing of thickening the object of the image data obtained from the under-color removal processing unit 1203 on the basis of these pieces of edge data. The method of thickening processing is the same as that of the first embodiment.

The color-material load limitation processing unit 1205 and the screen processing unit 1206 obtain the edge data having the information on the "position of an edge part after an object is thickened" from the edge data generating unit 1202. Then, the color-material load limitation processing unit 1205 executes the image processing to the image data obtained from the thickening processing unit 1204, and the screen processing unit 1206 executes the image processing to the image data obtained from the color-material load limitation processing unit 1205.

As mentioned above, according to the second embodiment, in the image processing before thickening of an object, the processing is executed on the basis of the information on the "position of an edge part after an object is thickened", while in the image processing after thickening, the processing is executed on the basis of the information on the "position of an edge part after an object is thickened". As a result, the method of image processing can be switched between the edge and the inside both before and after the object of the image data is thickened.

<Third Embodiment>

In the first embodiment, the example of thickening the object in the image data by one pixel in the four directions, that is, the upper, lower, right, and left directions is described. As a result, the width of the object is thickened by two pixels in total. In order to thicken the width of the object by one pixel in total, the object can be thickened by one pixel only in the two directions, that is, in the right and lower directions, for example, In the third embodiment, the operation unit obtains three types of setting of "0 pixels", "1 pixel", and "2 pixels" from the user as the setting of the "width to which the object is thickened" and thickens the width of the object in accordance with the instruction. Then, an embodiment of an image processing apparatus which can execute appropriate image processing after that will be described. In a case that the width to be thickened is "0 pixels", it indicates that the thickening processing is not executed. In the case of "1 pixel", it indicates that thickening by 1 pixel only in two directions, that is, in the right and lower directions, for example, is executed. In the case of "2 pixels", as described in the first embodiment, it indicates that thickening is executed by 1 pixel in the four directions, that is, the upper, lower, right, and left directions.

Configurations of the image processing apparatus 100 and the image processing unit 104 in the third embodiment are the same as those in the first embodiment. Processing contents different from those in the first embodiment will be described.

The operation unit 106 obtains three types of setting, that is, "0 pixels", "1 pixel", and "2 pixels" as the setting of the "width to which the object is thickened" from the user and notifies it to the image processing control unit 105.

The image processing control unit 105 instructs, to the image processing unit 104, the method for each portion of the image processing unit 104 to determine the "position of an edge part before an object is thickened" and the "position of an edge part after an object is thickened" on the basis of this setting information. Since the "position of an edge part after an object is thickened" is different depending on the width to which the object is thickened, the image processing control unit 105 sends an instruction to be a basis for determination on which position is to be the "position of an edge part after an object is thickened".

The edge data generating unit 202 determines positions of an edge directed to the right or lower direction and an edge directed to the left or upper direction before an object is thickened in the image data obtained from the memory buffer 201. Moreover, the edge data generating unit 202 determines positions of an edge directed to the right or lower direction and an edge directed to the left or upper direction after the object is thickened. Then, the edge data generating unit 202 generates the edge data including the information. The details of the processing of the edge data generating unit 202 for generating this edge data will be described later in [Description of Edge Data Generating Unit 202 in Third embodiment]. The edge data generating unit 202 outputs the generated edge data to the thickening processing unit 203, the under-color removal processing unit 204, the color-material load limitation processing unit 205, and the screen processing unit 206.

The edge data in the third embodiment is in a bitmap format with the same size as that of the image data and has 4-bit information for each pixel. The lowest bit is information on the "position of an edge part directed to the right or lower direction before an object is thickened", and in a case that its value is 0, it indicates that the pixel is not an edge part, while in a case that the value is 1, it indicates that the pixel is an edge part. Moreover, the second bit from the lowest is information on the "position of an edge part directed to the left or upper direction before an object is thickened", and in a case that its value is 0, it indicates that the pixel is not an edge part, while in a case that the value is 1, it indicates that the pixel is an edge part. Moreover, the third bit from the lowest is information on the "position of an edge part directed to the right or lower direction after an object is thickened by 1 pixel", and in a case that its value is 0, it indicates that the pixel is not an edge part, while in a case that the value is 1, it indicates that the pixel is an edge part. Moreover, the fourth bit from the lowest is information on the "position of an edge part directed to the left or upper direction after an object is thickened by 1 pixel", and in a case that its value is 0, it indicates that the pixel is not an edge part, while in a case that the value is 1, it indicates that the pixel is an edge part. As an example of the edge data in the third embodiment, the edge data generated from the image data illustrated in FIG. 3A is shown in FIG. 4C. The edge data in FIG. 4C has 4-bit information for each pixel, but for convenience of explanation, the value of each pixel is expressed in a decimal numerical value.

Subsequently, the thickening processing unit 203, the under-color removal processing unit 204, the color-material load limitation processing unit 205, and the screen processing unit 206 will be described. These processing methods are the same as those in the first embodiment, but the method of determining the "position of an edge part after an object is thickened" is different from that of the first embodiment. In the first embodiment, the "position of an edge part after an object is thickened" itself is included in the edge data outputted by the edge data generating unit 202. However, in the third embodiment, a bit of the edge data indicating the "position of an edge part after an object is thickened" is different depending on the setting of the "width to which an object is thickened" set by the user in the operation unit.

In a case that the setting of the "width to which an object is thickened" is "0 pixels", the pixel with the first bit or the second bit of the edge data being "1" indicates the "position of an edge part after an object is thickened".

In a case that the setting of the "width to which an object is thickened" is "1 pixel", the pixel with only the second bit or only the third bit of the edge data being "1" indicates the "position of an edge part after an object is thickened". The reason why the pixel with only the second bit or only the third bit being "1" is used will be described by using FIG. 4C. In FIG. 4C, the pixel with only the second bit being "1" is a pixel indicated by "2" in the decimal notation. The pixel with only the third bit being "1" is a pixel indicated by "4" in the decimal notation. Here, a lower left pixel in the inner edge in FIG. 4C is a pixel directed to a "lower direction" before the object is thickened and also directed to a "left direction". Therefore, since the first bit and the second bit are "1", it is indicated as "3" in the decimal notation. This pixel does not become a pixel at a position of an edge part after thickening since it is thickened in the lower direction in a case that it is actually thickened by 1 pixel width. Thus, in a case that the setting of the "width to which an object is thickened" is "1 pixel", the pixel with only the second bit or only the third bit of the edge data being "1" is assumed to indicate the "position of an edge part after an object is thickened".

Moreover, in a case that the setting of the "width to which an object is thickened" is "2 pixels", the pixel with the third bit or the fourth bit of the edge data being "1" indicates the "position of an edge part after an object is thickened". A method of determining as mentioned above is illustrated in FIG. 13. The image processing control unit 105 instructs this determining method to the thickening processing unit 203, the under-color removal processing unit 204, the color-material load limitation processing unit 205, and the screen processing unit 206.

<Details of Edge Data Generating Unit 202 in the Third Embodiment>

Figure 14:
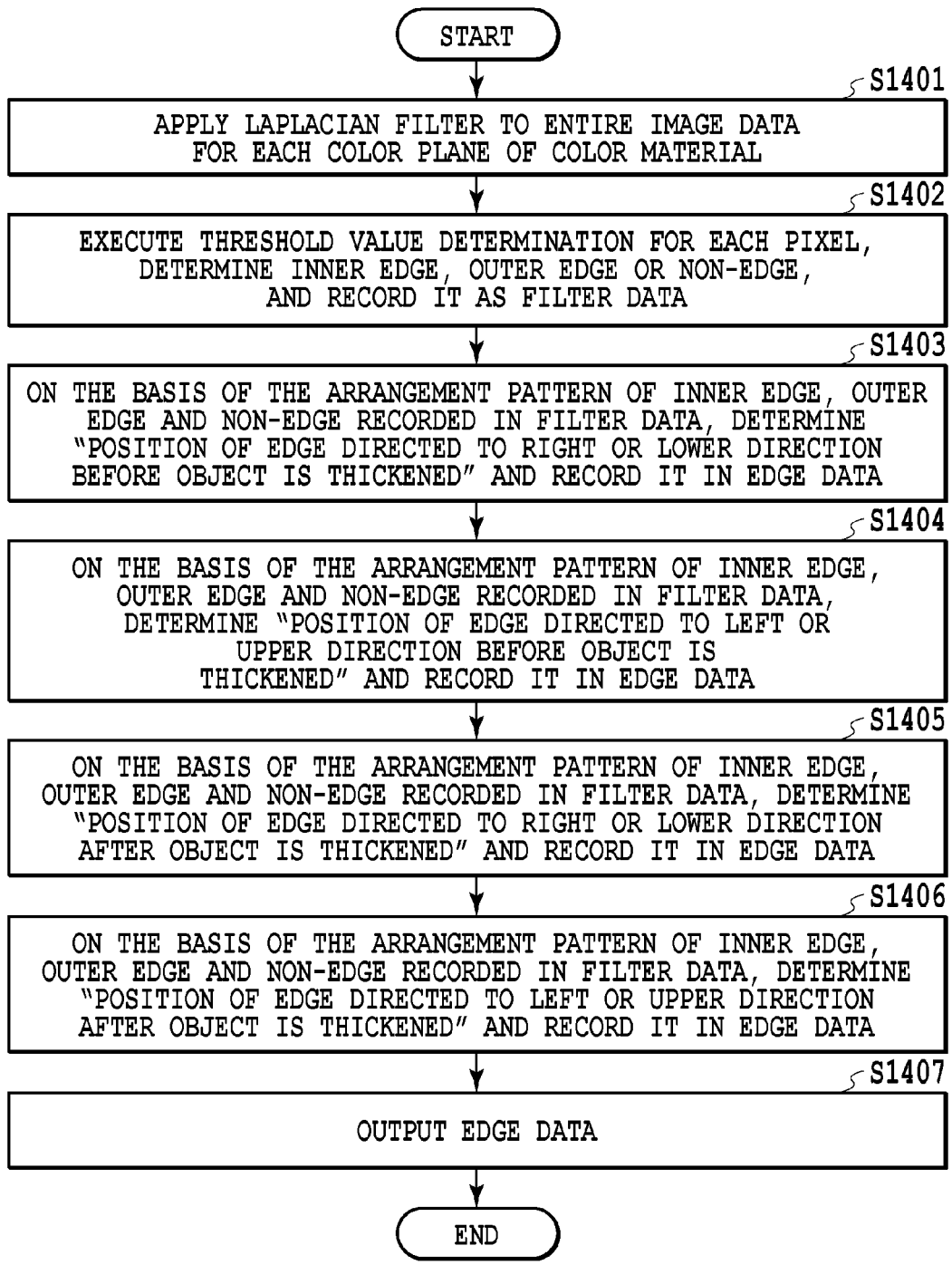
FIG. 14 is a flowchart illustrating processing of an edge data generating unit used in the explanation of the third embodiment.

The processing of the edge data generating unit 202 is illustrated in a flowchart in FIG. 14. First, at Step S1401, the edge data generating unit 202 applies the Laplacian filter to the entire image data for each color plane of a color material of the image data. This is the same processing as S501 in the first embodiment.

Subsequently, at Step S1402, the edge data generating unit 202 executes threshold value determination on the basis of a calculated value of the Laplacian filter for each pixel so as to generate filter data. This is the same processing as S502 in the first embodiment.

Subsequently, at Step S1403, the edge data generating unit 202 determines the "position of an edge part directed to the right or lower direction before an object is thickened" on the basis of the arrangement pattern of an inner edge, an outer edge, and a non-edge recorded in the filter data. Then, the position is recorded in the edge data. At this time, 1 is set to the lowest bit of a pixel value of a corresponding pixel of the edge data. This determining method may determine whether or not there is an outer edge in a pixel adjacent on the right or below with an inner edge being a pixel of interest in the edge data.

Subsequently, at Step S1404, the edge data generating unit 202 determines the "position of an edge part directed to the left or upper direction before an object is thickened" on the basis of the arrangement pattern of an inner edge, an outer edge, and a non-edge recorded in the filter data. Then, the position is recorded in the edge data. At this time, 1 is set to the second bit from the lowest of a pixel value of a corresponding pixel of the edge data. This determining method may determine whether or not there is an outer edge in a pixel adjacent on the left or above with an inner edge being a pixel of interest in the edge data.

Subsequently, at Step S1405, the edge data generating unit 202 determines the "position of an edge part directed to the right or lower direction after an object is thickened" on the basis of the arrangement pattern of an inner edge, an outer edge, and a non-edge recorded in the filter data. Then, the position is recorded in the edge data. In this determination, pattern matching of the patterns illustrated in FIG. 15A is executed for the filter data. The patterns illustrated in FIG. 15A correspond to those rotated by 0 degrees and 90 degrees in the patterns in FIG. 8. In a case that the pattern is matched, 1 is set to the third bit from the lowest of a pixel value of a pixel in the edge data corresponding to a pixel of a shaded cell.

Subsequently, at Step S1406, the edge data generating unit 202 determines the "position of an edge part directed to the left or upper direction after an object is thickened" on the basis of the arrangement pattern of an inner edge, an outer edge, and a non-edge recorded in the filter data. Then, the position is recorded in the edge data. In this determination, pattern matching of the patterns illustrated in FIG. 15B is executed for the filter data. The patterns illustrated in FIG. 15B correspond to those rotated by 180 degrees and 270 degrees in the patterns in FIG. 8. In a case that the pattern is matched, 1 is set to the fourth bit from the lowest of a pixel value of a pixel in the edge data corresponding to a pixel of a shaded cell.

Lastly, at Step S1407, the edge data generating unit 202 outputs the generated edge data to the thickening processing unit 203.

As mentioned above, according to the third embodiment, the operation unit obtains the three types of setting of "0 pixels", "1 pixel", and "2 pixels" as the width to which the object is thickened, from the user. Then, after the width of the object is thickened in accordance with the instruction, appropriate image processing can be made possible in the edge part of the object and inside the object.

In the third embodiment, the example in which, in a case that the "1 pixel" is instructed as the width to which the object is thickened, "the object is thickened in the right and lower directions is described. However, the thickening directions are not limited to them and the object may be thickened to the left and upper directions, for example.

<Fourth Embodiment>

In the first embodiment, the example in which the object in the image data is thickened by 1 pixel in the four directions, that is, the upper, lower, right, and left directions, is described. As a result, the "width of the object" is thickened by 2 pixels in total. However, in a case that resolutions of the rendering processing unit 103 and the printing processing unit 107 are higher, it is preferable that the width of the edge part is 2 pixels and the width to which the object is thickened can be up to 4 pixels in total in order to exert an effect according to the resolutions. In the fourth embodiment, the width of the edge part is set to 2 pixels, and the setting in three stages, that is, "0 pixels", "2 pixels", and "4 pixels" in total is obtained by the operation unit as the setting of the "width to which an object is thickened" from the user. The embodiment of the image processing apparatus in which, after the width of the object is thickened by plural pixels in accordance with the instruction, application of appropriate image processing is made possible will be described.

The configurations of the image processing apparatus 100 and the image processing unit 104 in the fourth embodiment are the same as those in the first embodiment. Only processing contents different from those in the first embodiment will be described.

The operation unit 106 obtains the three types of setting, that is, "0 pixels", "2 pixels", and "4 pixels" as the setting of the "width to which an object is thickened" from the user and notifies it to the image processing control unit 105.

The image processing control unit 105 instructs, to the image processing unit 104, the method for each "portion of the image processing unit 104 to determine the "position of an edge part before an object is thickened" and the "position of an edge part after an object is thickened". The edge data generating unit 202 determines each position for the image data obtained from the memory buffer 201. That is, the edge data generating unit 202 determines the "position of an edge part before an object is thickened", the "position of an edge part after a width of an object is thickened by 2 pixels", and "the position of an edge part after a width of an object is thickened by 4 pixels". Then, the edge data generating unit 202 generates edge data including the information. The details of the processing of the edge data generating unit 202 for generating this edge data will be described later in [Description of Edge Data Generating Unit 202 in the Fourth embodiment]. The edge data generating unit 202 outputs the generated edge data to the thickening processing unit 203, the under-color removal processing unit 204, the color-material load limitation processing unit 205, and the screen processing unit 206. The edge data generating unit 202 outputs the generated edge data to the thickening processing unit 203, the under-color removal processing unit 204, the color-material load limitation processing unit 205, and the screen processing unit 206.

The edge data in the fourth embodiment is in a bitmap format with the same size as that of the image data and has 3-bit information for each pixel. The lowest bit is information on the "position of an edge part before an object is thickened", and in a case that its value is 0, it indicates that the pixel is not an edge part, while in a case that the value is 1, it indicates that the pixel is an edge part. Moreover, the second bit from the lowest is information on the "position of an edge part after a width of an object is thickened by 2 pixels", and in a case that its value is 0, it indicates that the pixel is not an edge part, while in a case that the value is 1, it indicates that the pixel is an edge part. Moreover, the third bit from the lowest is information on the "position of an edge part after a width of an object is thickened by 4 pixels", and in a case that its value is 0, it indicates that the pixel is not an edge part, while in a case that the value is 1, it indicates that the pixel is an edge part. As an example of the edge data in the fourth embodiment, the edge data generated from the image data illustrated in FIG. 3A is shown in FIG. 4D. The edge data in FIG. 4D has 3-bit information for each pixel, but for convenience of explanation, the value of each pixel is expressed in a decimal numerical value. In FIG. 4D, since the width of the edge part is 2 pixels, a pixel further inside the inner edge is also a position of an edge part before an object is thickened. The details of the processing of the edge data generating unit 202 in the fourth embodiment will be described later.

Subsequently, the under-color removal processing unit 204, the color-material load limitation processing unit 205, and the screen processing unit 206 will be described. These processing methods are similar to those in the first embodiment, but the method of determining the "position of an edge part after an object is thickened" is different from that in the first embodiment. In the fourth embodiment, in accordance with the setting of the "width to which an object is thickened" set by the user in the operation unit, a bit of the edge data indicated by the "position of an edge part after an object is thickened" is different. In a case that the setting of the "width to which an object is thickened" is "0 pixels", the first bit of the edge data indicates the "position of an edge part after an object is thickened". In a case that the setting of the "width to which an object is thickened" is "2 pixels", the second bit of the edge data indicates the "position of an edge part after an object is thickened". In a case that the setting of the "width to which an object is thickened" is "4 pixels", the third bit of the edge data indicates the "position of an edge part after an object is thickened". This determining method is illustrated in FIG. 16. The image processing control unit 105 instructs this determining method to the thickening processing unit 203, the under-color removal processing unit 204, the color-material load limitation processing unit 205, and the screen processing unit 206.

Subsequently, the processing of the thickening processing unit 203 will be described. The thickening processing unit 203 also determines the "position of an edge after an object is thickened" in accordance with FIG. 16. As the processing of thickening an object, first, a pixel at the "position of an edge after an object is thickened" is detected from the edge data. Then, that pixel is made a pixel of interest, and a pixel indicating the "position of an edge before an object is thickened" is detected within 2 pixels in the upper, lower, right, and left directions. In a case that such a pixel is found, a pixel value of that pixel in the image data is overwritten to the pixel of interest in the image data.

<Details of Edge Data Generating Unit 202 in the Fourth Embodiment>

Figure 17:
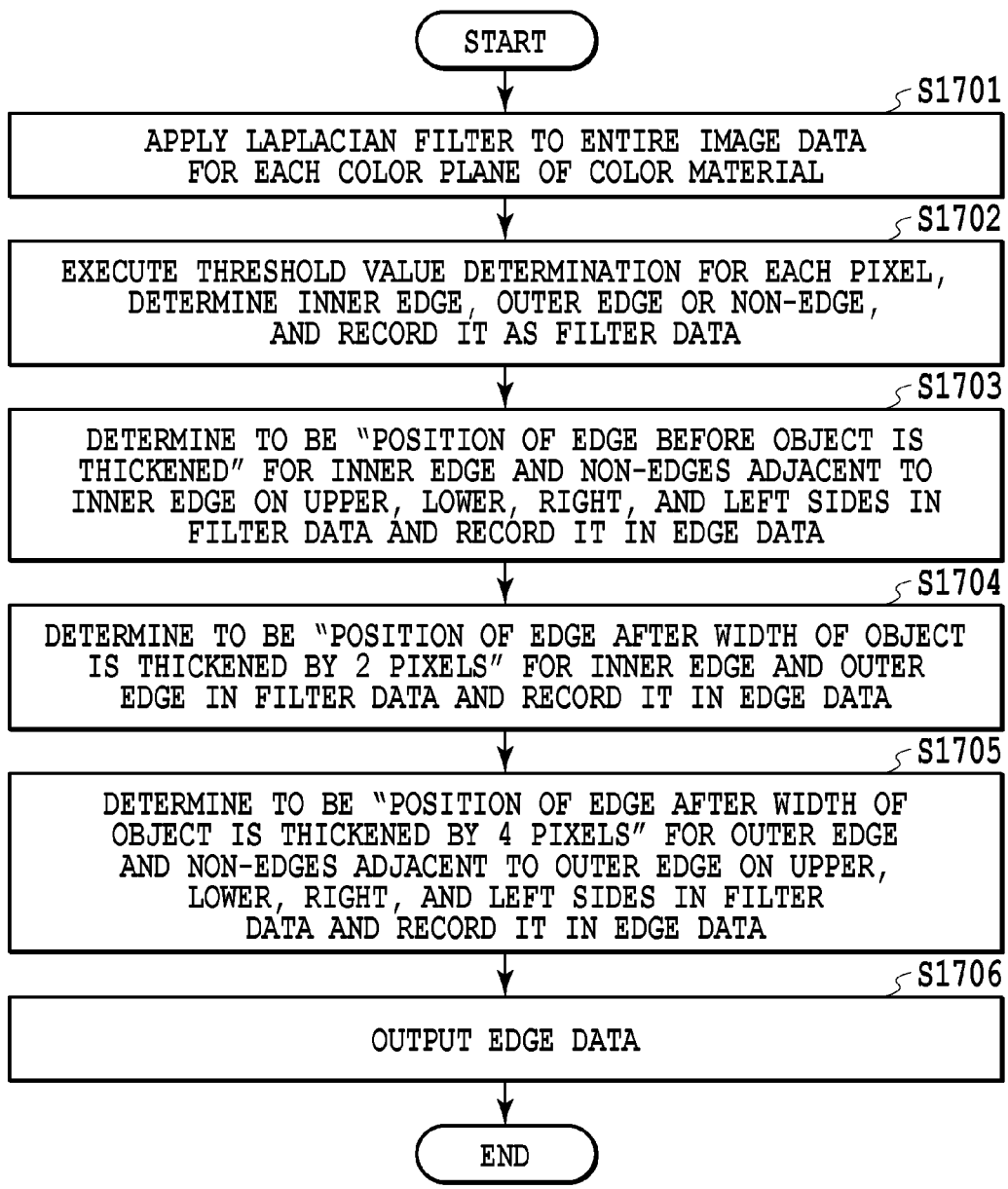
FIG. 17 is a flowchart illustrating processing of an edge data generating unit used in the explanation of the fourth embodiment.

The processing of the edge data generating unit 202 is illustrated in a flowchart in FIG. 17. In order to simplify explanation in the fourth embodiment, an "object which is connected in a case that it is thickened" considered in the first embodiment and illustrated in FIGS. 9A to 9F will not be considered.

First, at Step S1701, the edge data generating unit 202 applies the Laplacian filter to the entire image data for each color plane of a color material of the image data. This is the same processing as S501 in the first embodiment. Subsequently, at Step S1702, the edge data generating unit 202 executes threshold value determination on the basis of a calculated value of the Laplacian filter for each pixel so as to generate filter data. This is the same processing as S502 in the first embodiment.

Subsequently, at Step S1703, the edge data generating unit 202 determines that an inner edge and non-edges adjacent to the inner edge on the upper, lower, right, and left sides in the filter data to be the "positions of edges before an object is thickened" and records them in the edge data. At this time, 1 is set to the lowest bit of a pixel value of a corresponding pixel in the edge data.

Subsequently, at Step S1704, the edge data generating unit 202 determines an inner edge and an outer edge in the filter data as the "positions of edge parts after a width of an object is thickened by 2 pixels" and records them in the edge data. That is, it determines to be the position of the edge part after the width of the object is thickened by 2 pixels in total. At this time, 1 is set to the second bit from the lowest of the pixel value of the corresponding pixel in the edge data.

Subsequently, at Step S1705, the edge data generating unit 202 determines an outer edge and non-edges adjacent to the outer edge on the upper, lower, right, and left sides in the filter data to be the "positions of edges after a width of an object is thickened by 4 pixels" and records them in the edge data. That is, it determines to be the position of the edge part after the width of the object is thickened by 4 pixels in total. At this time, 1 is set to the third bit from the lowest of the pixel value of the corresponding pixel in the edge data.

Lastly, at Step S1707, the edge data generating unit 202 outputs the edge data to the thickening processing unit 203.

As mentioned above, according to the fourth embodiment, the width of the edge is made 2 pixels, and the width of the object is thickened in three stages of the width of the object to be thickened, that is, "0 pixels", "2 pixels", and "4 pixels" and then, appropriate image processing can be applied.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, predetermined image processing can be applied to an edge part of a deformed object without analyzing image data again.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-159745, filed Aug. 5, 2014, which is hereby incorporated by reference wherein in its entirety.

What is claimed is:

1. An image processing apparatus, comprising:
a determining unit configured to determine a position separated by a predetermined distance from an edge of an object included in image data, the position being outer side of the object;
a deforming unit configured to deform a shape of the object based on the determined position so that the determined position becomes a new edge of the object; and
a processing unit configured to perform predetermined image processing for edge, based on the determined position, on the new edge of the object after the deformation is performed by the deforming unit.

2. The image processing apparatus according to claim 1, wherein
the determining unit further determines together with the separated position, before the deformation is performed, a position of original edge of the object before the deformation is performed; and
the processing unit performs predetermined image processing for inner of the object, based on the determined position of the original edge, on the original edge of the object before the deformation is performed, wherein the image processing for inner of the object is different from the image processing for edge.

3. The image processing apparatus according to claim 1, wherein
the determining unit determines a position of the new edge after deformation in upper, lower, right, and left directions is performed on the object.

4. The image processing apparatus according to claim 1, wherein
the determining unit determines a position of the new edge after deformation only in a part of the upper, lower, right, and left directions is performed on the object.

5. The image processing apparatus according to claim 4, wherein
the determining unit uses a position of an edge corresponding to a direction other than the part of the directions to the object as a position of the new edge of the object after the deformation is performed.

6. The image processing apparatus according to claim 1, wherein
the predetermined distance corresponds to predetermined plurality of pixels
the determining unit determines a position of the new edge after deformation for the plurality of pixels is performed on the object.

7. The image processing apparatus according to claim 1, wherein
the determining unit determines, for each pixel of the image data, whether the pixel is an edge inside the object, an edge outside the object or the others and determines the position by using a determination result.

8. The image processing apparatus according to claim 1, wherein
the determining unit determines a position of the edge of the object before the deformation is performed as a position of the new edge of the object after the deformation is performed in a case that the objects are close to each other.

9. The image processing apparatus according to claim 1, wherein
the deforming unit performs the deformation by overwriting a pixel value of a pixel at a position of the new edge of the object after the deformation is performed with a pixel value of a pixel close to the pixel.

10. The image processing apparatus according to claim 9, wherein
the deforming unit performs the deformation by overwriting a pixel value of a pixel at a position of the new edge of the object after the deformation is performed with a pixel value of a pixel in the object close to the pixel.

11. The image processing apparatus according to claim 9, wherein
the deforming unit performs the deformation by overwriting a pixel value of a pixel at a position of original edge of the object before the deformation is performed with a pixel value of a pixel outside the object close to the pixel.

12. An image processing apparatus comprising:
an obtaining unit configured to obtain image data including an object;
an determining unit configured to determine, by analyzing the obtained image data including the object on which a deformation is not yet performed, a position separated from an edge of the object included in image data, as a position of new edge of the object on which the deformation has been performed;
a deforming unit configured to perform the deformation by deforming a shape of the object included in the obtained image data; and
an image processing unit configured to perform image processing on the image data including the object on which the deformation has been performed,
wherein,
the determining unit is configured to output information indicating the determined position of the new edge, to the image processing unit, and
the image processing unit is configured to perform, based on the information output from the determining unit, the image processing on the image data including the object on which the deformation has been performed.

13. An image processing method, comprising:
determining a position separated by a predetermined distance from an edge of an object included in image data, the position being outer side of the object;
deforming a shape of the object based on the determined position so that the determined position becomes a new edge of the object; and
performing predetermined image processing for edge, based on the determined position, on the new edge of the object after the deformation is performed.

* * * * *